(12) United States Patent
James

(10) Patent No.: US 10,963,120 B2
(45) Date of Patent: Mar. 30, 2021

(54) INTEGRATED, CONTEXT PASSING USER DISPLAY

(71) Applicant: Refinitiv US Organization LLC, New York, NY (US)

(72) Inventor: Harry G. James, Poughkeepsie, NY (US)

(73) Assignee: Refinitiv US Organization LLC, New York, NY (US)

( * ) Notice: Subject to any disclaimer, the term of this patent is extended or adjusted under 35 U.S.C. 154(b) by 0 days.

(21) Appl. No.: 14/089,198

(22) Filed: Nov. 25, 2013

(65) Prior Publication Data
US 2014/0082551 A1    Mar. 20, 2014

Related U.S. Application Data

(63) Continuation of application No. 11/520,099, filed on Sep. 13, 2006, now abandoned.

(51) Int. Cl.
*G06F 3/0481* (2013.01)
*G06F 16/954* (2019.01)

(52) U.S. Cl.
CPC .......... *G06F 3/0481* (2013.01); *G06F 16/954* (2019.01)

(58) Field of Classification Search
None
See application file for complete search history.

(56) References Cited

U.S. PATENT DOCUMENTS

| | | | |
|---|---|---|---|
| 5,878,421 A | 3/1999 | Ferrel et al. | |
| 5,907,837 A | 5/1999 | Ferrel et al. | |
| 5,983,267 A | 11/1999 | Shklar et al. | |
| 6,199,099 B1 * | 3/2001 | Gershman et al. | 709/203 |
| 6,363,398 B1 | 3/2002 | Andersen | |
| 6,584,480 B1 | 6/2003 | Ferrel et al. | |
| 6,647,410 B1 * | 11/2003 | Scimone et al. | 709/206 |
| 2001/0035875 A1 * | 11/2001 | Suzuki | G06T 11/60 715/723 |
| 2002/0029296 A1 | 3/2002 | Anuff et al. | |
| 2003/0063125 A1 * | 4/2003 | Miyajima et al. | 345/781 |
| 2003/0126136 A1 | 7/2003 | Omoigui | |
| 2004/0199497 A1 | 10/2004 | Timmons | |
| 2005/0097180 A1 | 5/2005 | Abdelhak | |
| 2005/0197952 A1 * | 9/2005 | Shea | G06Q 40/025 705/38 |

(Continued)

OTHER PUBLICATIONS

Eckstein, Java SE Application Design With MVC Mar. 7, oracle, http://www.oracle.com/technetwork/articles/javase/index-142890.html.*

(Continued)

*Primary Examiner* — Jason G Liao
(74) *Attorney, Agent, or Firm* — Norton Rose Fulbright US LLP

(57) ABSTRACT

Systems and methods are provided to facilitate an integrated display of information to a user. According to some embodiments, a first service and a second service may be registered with a registry. The information stored in the registry might include, for example, indications that the first and/or second services are to receive data from disparate remote sources. According to some embodiments, placement information is received from a user to lay out the first and second services within a pane of an application. Moreover, information from the remote sources may be displayed to the user within the pane.

19 Claims, 12 Drawing Sheets

(56) References Cited

U.S. PATENT DOCUMENTS

2006/0005124 A1* 1/2006 Speicher ...................... 715/514

OTHER PUBLICATIONS

AWT Threading Issues date unknown [captured on Feb. 7, 2004 by archive.org], Sun Microsystems, https://web.archive.org/web/20040207204936/http://java.sun.com/j2se/1.5.0/docs/api/java/awt/doc-files/AWTThreadIssues.html.*
Silberschatz et al., Operating System Concepts 1997, John Wiley & Sons., 5$^{th}$ ed., pp. 108-120.*
Webster's Encyclopedic Unabridged Dictionary of the English Language 1989, Gramercy Books, Cover page, p. 1162.*
BamPelotas, Make Server Quake 3 Arena Dec. 28, 2007, YouTube, https://www.youtube.com/watch?v=I2sUAkTCj-c.*
Grundy et al., "Developing adaptable user interfaces for component-based systems," 2002, Elsevier Science B.V., Interacting with Computers 14 (2002), 12 pages.
Kotsiopoulos et al., "IBHIS: Integration Broker for Heterogeneous Information Sources," Proceedings IEEE Computer Society's International Computer Software and Applications Conference, 2003, 7 pages.

* cited by examiner

| SERVICE ID 1102 | SERVICE STATUS 1104 | INPUTS AND OUTPUTS 1106 | USER ROLES 1108 |
|---|---|---|---|
| WEB_SERV_01 | ACTIVE - FIRST LOCATION | RECEIVE: ACCOUNT NO. | ALL |
| APP_01 | ACTIVE - SECOND LOCATION | RECEIVE: ACCOUNT NO. RECEIVE: CURRENT PRICE | FINANCIAL ADVISERS |
| CHART_01 | NOT ACTIVE | RECEIVE: ACCOUNT NO. | ALL |
| WEB_SERV_02 | ACTIVE - THIRD LOCATION | RECEIVE: ACCOUNT NO. PUBLISH: ADDRESSES | REAL ESTATE BROKERS |

FIG. 11

INTEGRATED, CONTEXT PASSING USER DISPLAY

CROSS-REFERENCE TO RELATED APPLICATIONS

This application is a continuation of and claims priority to U.S. patent application Ser. No. 11/520,099, filed Sep. 13, 2006, the content of which is incorporated by reference herein in its entirety.

COPYRIGHT AUTHORIZATION

A portion of the disclosure of the patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The present invention relates to the presentation of information to a user. In particular, some embodiments are associated with an integrated display of information to a user.

BACKGROUND

A user may view information from a number of different sources. For example, FIG. 1 is a block diagram overview of an information environment 100 wherein a user display 120 receives information from a number of different and/or disparate data systems 110. The data systems 110 might comprise, for example, remote information applications that transmit data through a computer network (e.g., a stream of stock prices or batches of news articles). The user display 120 might comprise, for example, a computer monitor.

To display data to the user, a number of different applications might be running at a user device, and each application can be associated with different screens and/or display windows. For example, a user might start a first program that displays stock prices and position a first display associated with the first program on his or her desktop. The user could then start a second program that displays news articles and position a second display associated with the second program on his or her desktop (e.g., along side the first display of stock prices). In this way, a user can manually configure the user display 120. Such an approach, however, can consume a considerable amount of time (especially when a user needs to constantly re-arrange the user display 120).

Moreover, some or all of the data on the user display 120 may depend on a specific context associated with the information. For example, a user might be interested in the price of a particular stock, or group of stocks. Similarly, the user might be interested in viewing news articles associated with a particular company or industry. In some cases, a user can enter context information into each application running at the user display 120. For example, the user might enter "MSFT" into a program that displays stock prices and "microsoft" into a program that displays news articles. This manual approach, however, can also be time consuming. Moreover, the approach can lead to errors (e.g., a user might incorrectly enter "microseft" into an application and, as a result, not receive news articles associated with Microsoft Corp.

Another disadvantage with typical user displays 120 is that it can be expensive to create the systems required to support a number of disparate data systems 110. This can be especially true when there are a substantially number of users and/or a substantial number of data systems 110 (and various combinations of those systems 110). Moreover, it can be difficult to update and maintain those systems (e.g., when a data system 110 alters the way it transmits information or a new data system 110 is added to a user display 120).

SUMMARY

To alleviate problems inherent in the prior art, the present invention introduces systems and methods to provide an integrated display of information to a user.

In some embodiments of the present invention, a first service and a second service may be registered with a registry. The information stored in the registry might include, for example, indications that the first and/or second services are to receive data from disparate remote sources.

According to some embodiments, placement information is received from a user to lay out the first and second services within a pane of an application. Moreover, information from the remote sources may be displayed to the user within the pane.

According to some embodiments, placement information is received from a user via a contact information application. The placement information may, for example, lay out a first and second display area, the first display area being associated with a first service to receive data from a first remote source and the second display area being associated with a second service to receive data from a second remote source. Data from the first and second remote sources may then be displayed to the user via the contact information application.

According to another embodiment, first and second services are established to receive data from remote, independent sources. Placement information may be received from a user to lay out the services within a pane of a host application. Context information associated with a service may then be dynamically determined context information, and information associated with the context information may be displayed to the user within the pane.

Some other embodiments comprise: means for registering, with a registry, a first service including an indication that the first service is to receive data from a first remote source; means for registering, with the registry, a second service including an indication that the second service is to receive data from a second remote source, the second remote source being independent of the first remote source; means for receiving, from a user, placement information laying out the first and second services within a pane of an application; means for registering, with the registry, information associated with the pane including layout information; and means for displaying to the user information from the first and second remote sources within the pane.

Still other embodiments comprise: means for receiving from a user, via a contact information application, placement information laying out a first and second display area, the first display area being associated with a first service to receive data from a first remote source and the second display area being associated with a second service to receive data from a second remote source; and means for displaying to the user data from the first and second remote sources via the contact information application.

Yet other embodiments comprise: means for establishing a first service to receive data from a first remote source; means for establishing a second service to receive data from a second remote source, the second remote source being independent of the first remote source; means for receiving, from a user, placement information laying out the first and second services within a pane of a host application; means for dynamically determining context information associated with the first service; and means for displaying to the user information from the first and second remote sources within the pane, wherein the information from the first remote source is associated with the context information.

With these and other advantages and features of the invention that will become hereinafter apparent, the invention may be more clearly understood by reference to the following detailed description of the invention, the appended claims, and the drawings attached herein.

BRIEF DESCRIPTION OF THE DRAWINGS

FIG. 11 is a tabular representation of a database according to one embodiment of the present invention.

DETAILED DESCRIPTION

Figure 1:
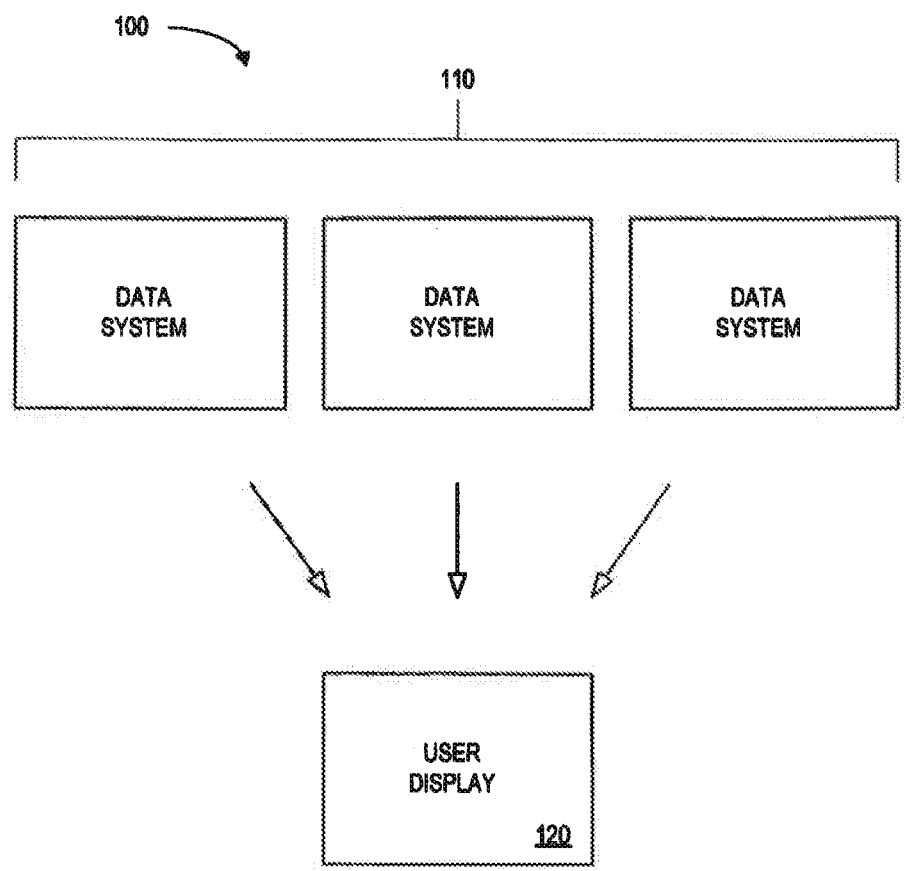
FIG. 1 is a block diagram overview of an information environment.
Figure 2A:
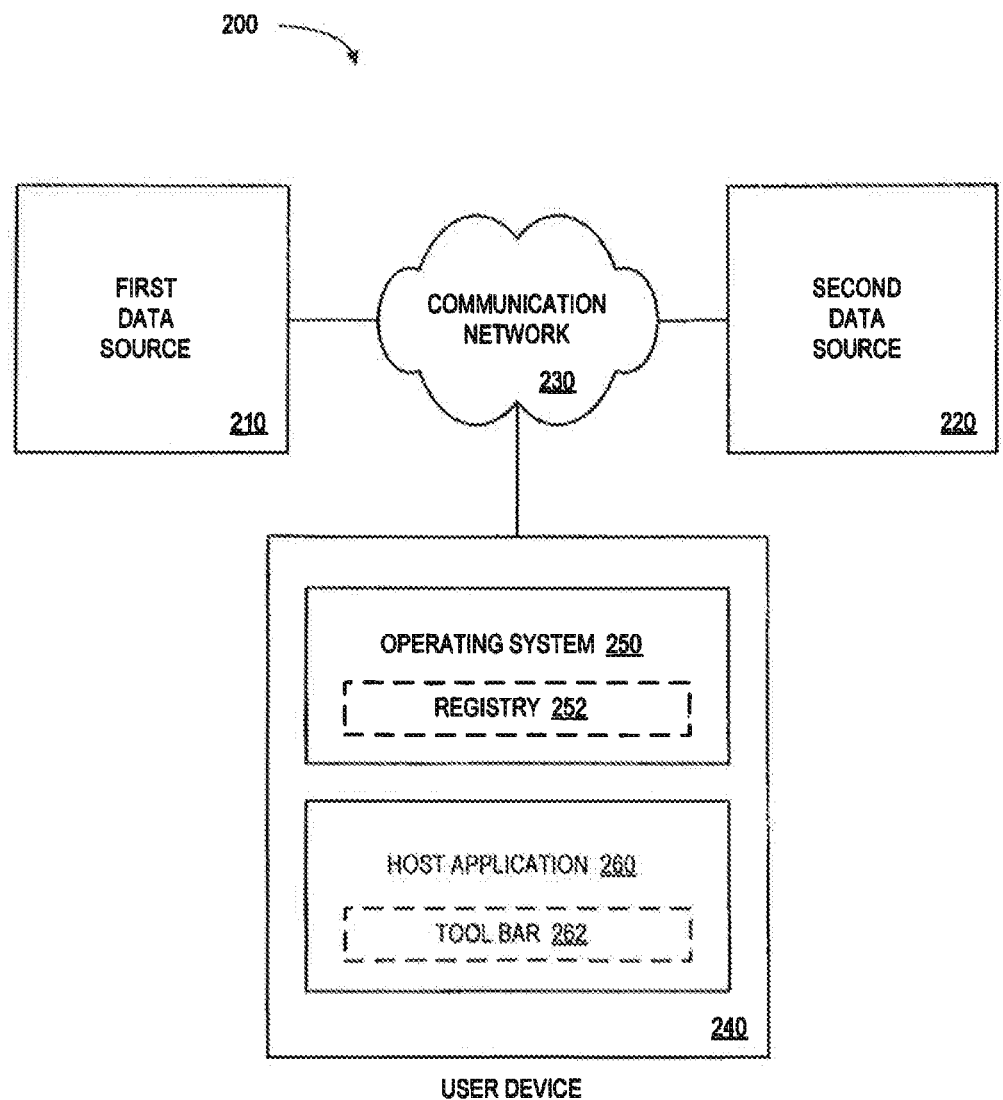
FIGS. 2A and 2B are block diagram overviews of systems according to some embodiments of the present invention.

FIG. 2A is a block diagram overview of a system 200 according to some embodiments of the present invention. In particular, a first data source 210 and a second data source 220 (e.g., sources that include or are associated with information databases) may transmit information via a communication network 230. As used herein, the phrase "communication network" may refer to, by way of example only, a Local Area Network (LAN), a Metropolitan Area Network (MAN), a Wide Area Network (WAN), a proprietary network, a wireless network, an Ethernet network, and/or an Internet Protocol (IP) network such as the Internet, an intranet, and/or an extranet. The data sources 210, 220 may be associated with, for example, Internet servers and/or proprietary data systems. Examples of data sources 210, 220 might include, for example, the REUTERS KNOWLEDGE® or REUTERS PLUS® information services.

A user device 240 may receive the information from the data sources 210, 220. The user device 240 might comprise, for example, a Personal Computer (PC), a Personal Digital Assistant (PDA), a mobile computer, and/or a wireless device. Although a single user device 240 is illustrated in FIG. 2A, any number of user devices 240 could be provided.

According to some embodiments of the present invention, the user device 240 may include an Operating System (OS) 250, such as MICROSOFT WINDOWS®, and a host application 260, such as the MICROSOFT OFFICE OUTLOOK® contact information application. Note that the particular OS 250 and host application 260 are provided only as examples and embodiments may be practice with a different OS 250 or host application 260. For example, the LOTUS® contact information application may instead be used at the user device 240.

Figure 2B:
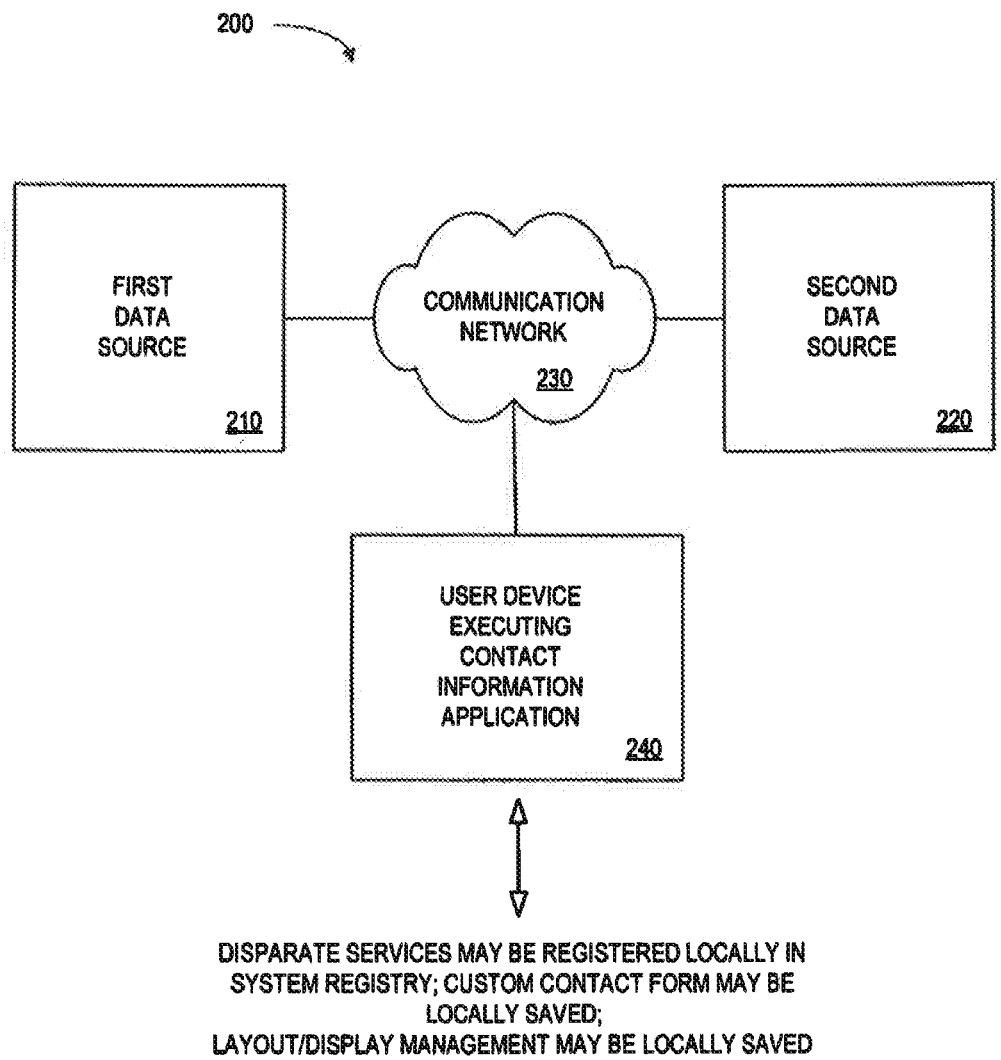

Consider, for example, FIG. 2B which illustrates the system 200 wherein the user device 240 is executing a contact information application (e.g., MICROSOFT OFFICE OUTLOOKS). In this case, disparate services may be registered locally in the user device's system registry. Moreover, one or more custom contact forms may be locally saved at the user vice device 240 along with layout and/or display management information.

Figure 3:
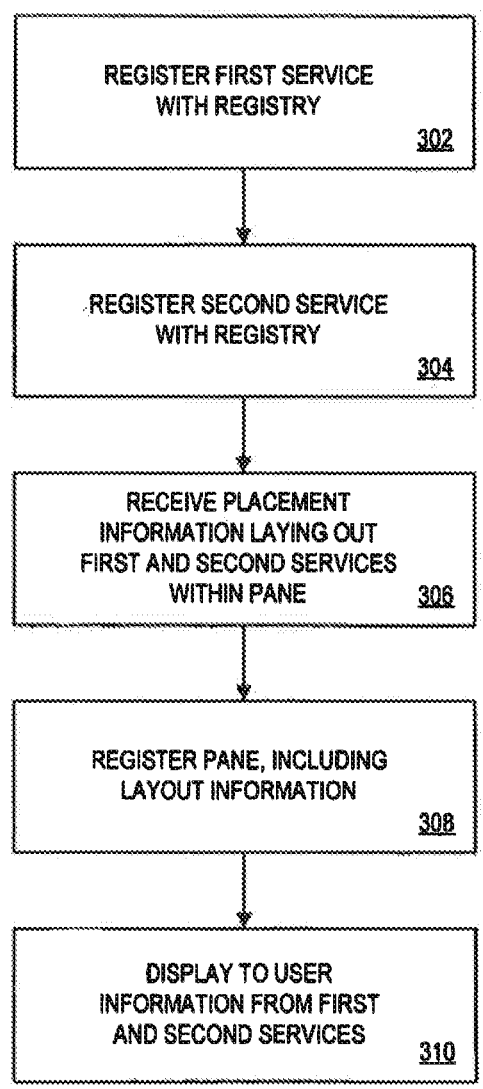
FIG. 3 is a flow chart of a method of according to some embodiments of the present invention.

The user device 240 may be adapted to provide an integrated, context passing information display to a user. For example, FIG. 3 is a flow chart of a method of according to some embodiments of the present invention. The flow charts described herein do not imply a fixed order to the steps, and embodiments of the present invention may be practiced in any order that is practicable.

At 302, a first "service" may be registered with a registry. As used herein, the term "service" might refer to, for example, a Web service, an applet, an Active X service, a chart, a graph, or any other type of component that may provide data. Referring to FIG. 2A, a first service might be registered with the registry 252 of the OS 250 executing at the user device 240. The registered information might include an indication that the first service is to receive data from the first remote data source 210. According to some embodiments, the registration information associated with the first service further includes an indication that the first service is to publish data (e.g., is able to provide data to other services and/or applications).

Similarly, a second service may be registered with the registry 252 at 304, including an indication that the second service is to receive data from the second remote data source 220. Note that the second remote data source 220 may be independent of the first remote data source 210 (e.g., they may be owned or operated by different entities and/or be located remote from each other).

Figure 4:
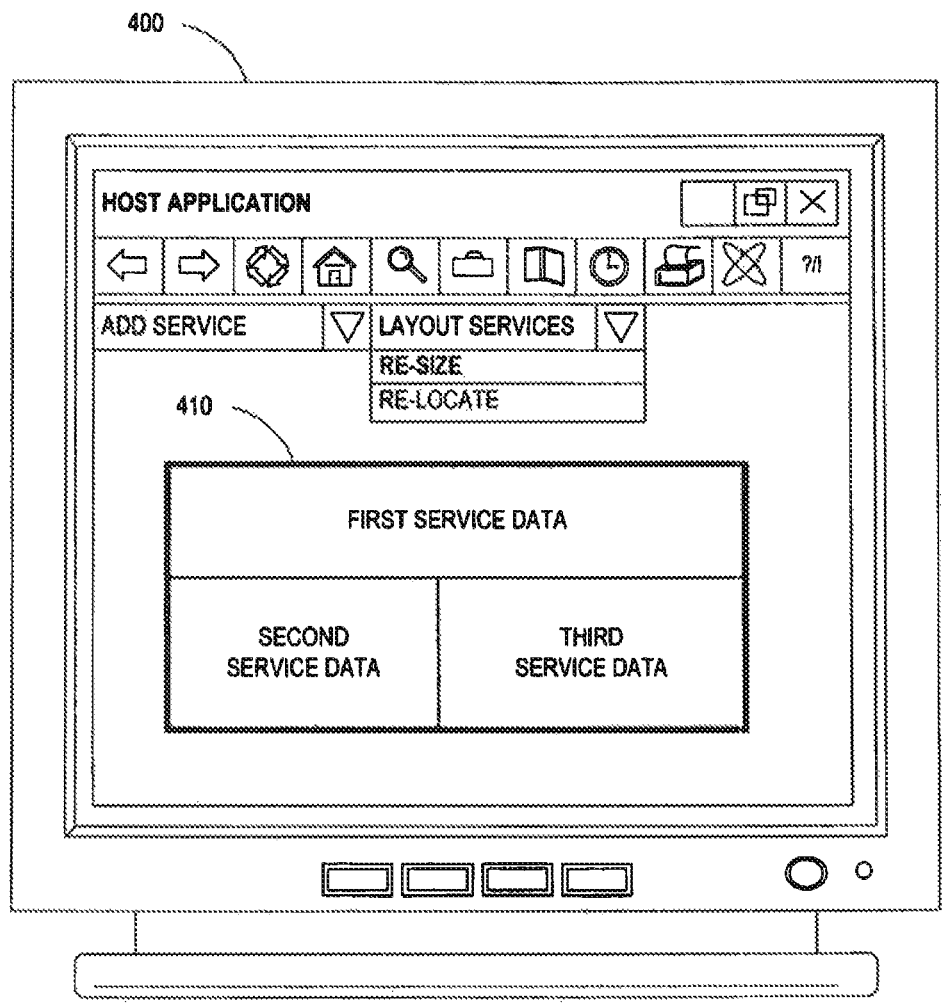
FIG. 4 illustrates a display according to some embodiments of the present invention.

At 306, placement information may be received from a user. The placement information may, for example, lay out the first and second services within a pane of an application. Referring to FIG. 2A, a Graphical User Interface (GUI) tool bar 262 add-on or plug-in to the host application 260 may be used to provide the placement information. Consider, for example, FIG. 4 which illustrates a display 400 according to some embodiments of the present invention. In this case, a user might select to "add a service" or to "layout services" (e.g., by re-sizing or re locating a service) within a pane 410 of a host application. According to some embodiments, at 308 information associated with the pane 410, including layout information, may also be registered with the registry 252.

Figure 5:
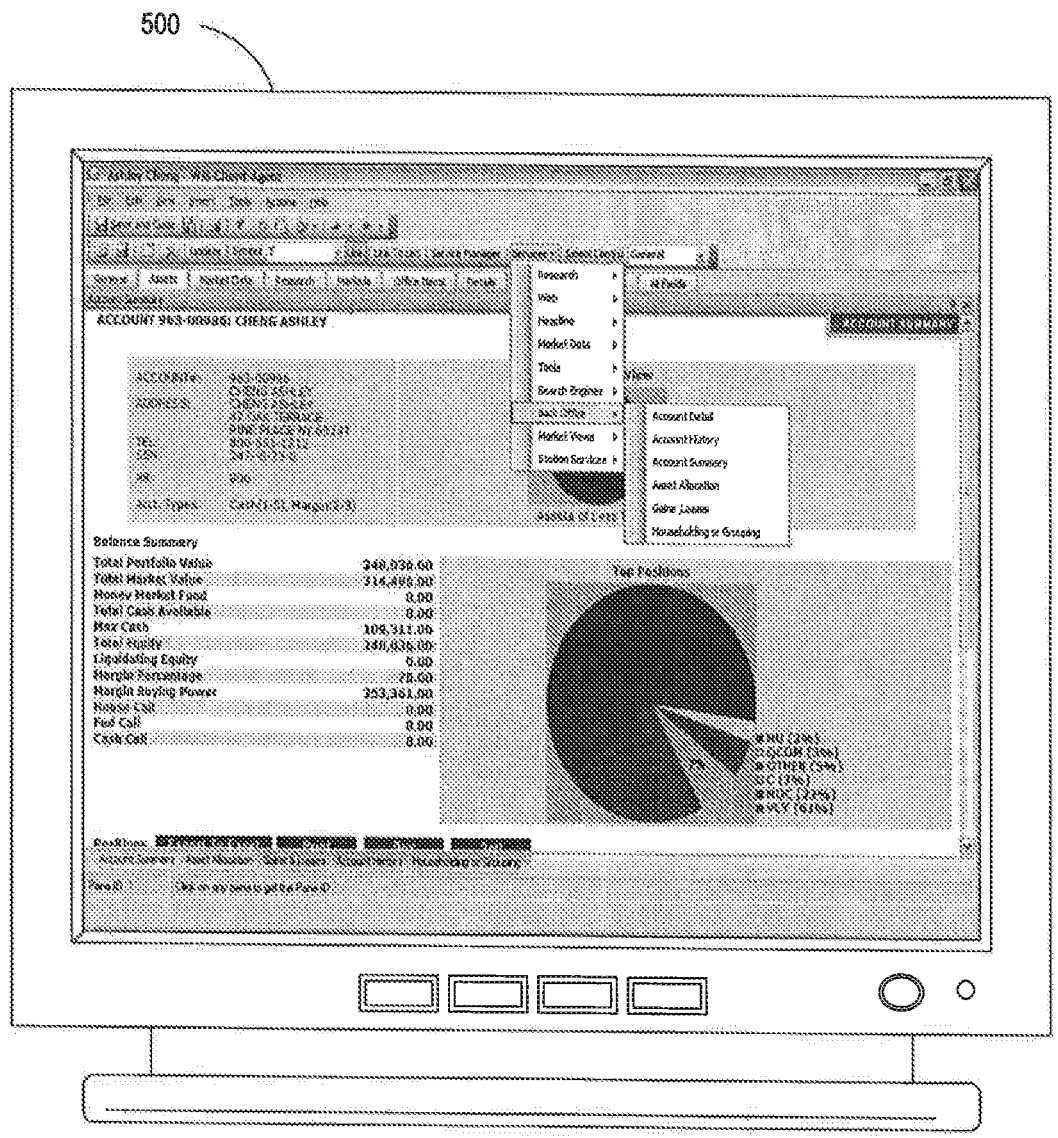
FIGS. 5 and 6 are examples of displays according to some embodiments of the present invention.
Figure 6:
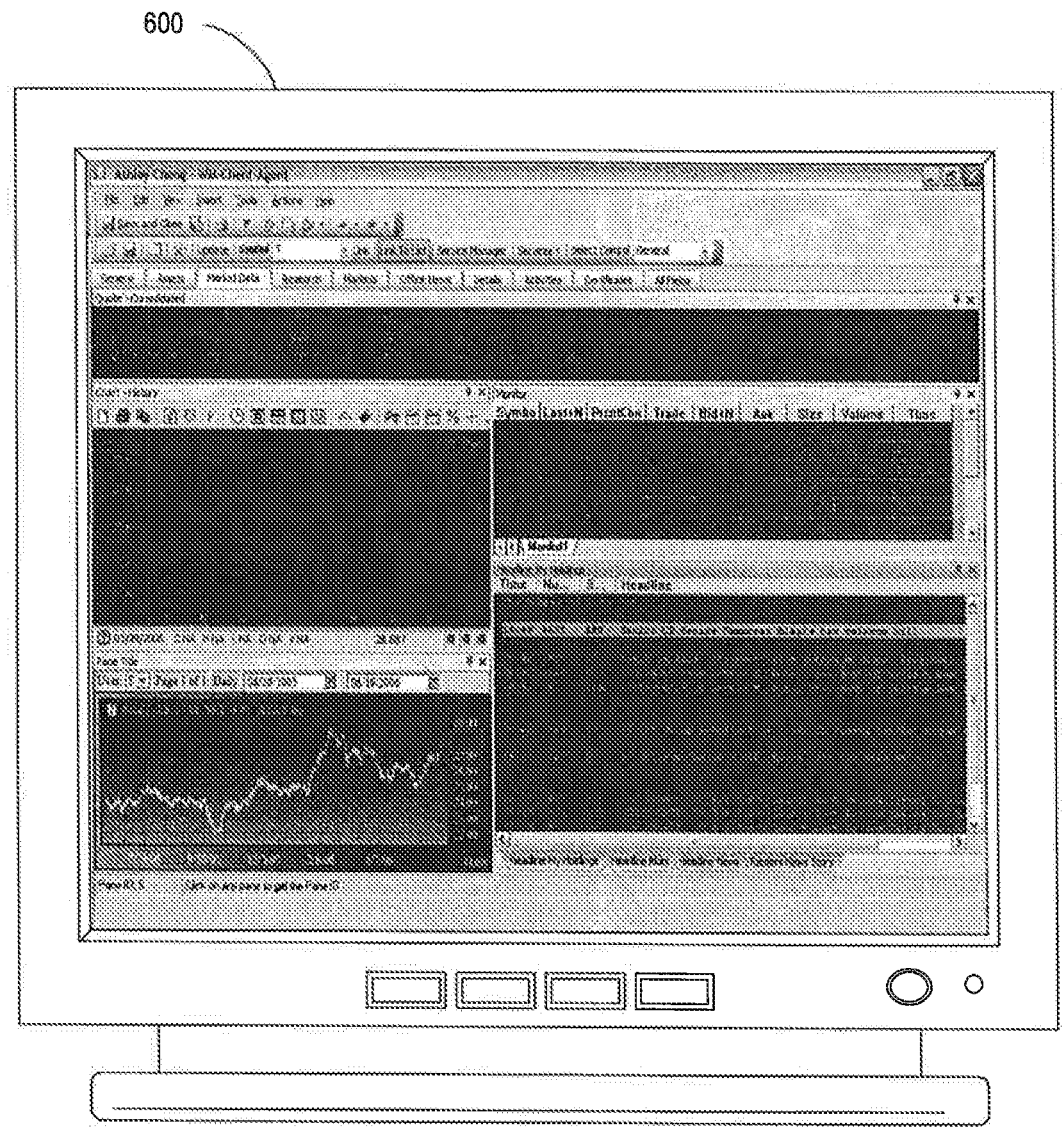

At 310, information from the first and second remote data sources 210, 220 may be displayed to the user within the pane 410 of the host application 260. Consider, by way of example only, FIG. 5 which illustrates a display 500 wherein the host system is associated with MICROSOFT OUTLOOKS. In this case, information associated with various remote data sources might be displayed to a user as a set of tables, lists, and/or charts within a MICROSOFT OUTLOOK® display pane (on a page labeled "Assets" in FIG. 5). Similarly, other types of charts and lists are illustrated by the display 600 of FIG. 6 (which includes a MICROSOFT OUTLOOKS display pane on a page labeled Market Data").

Figure 7:
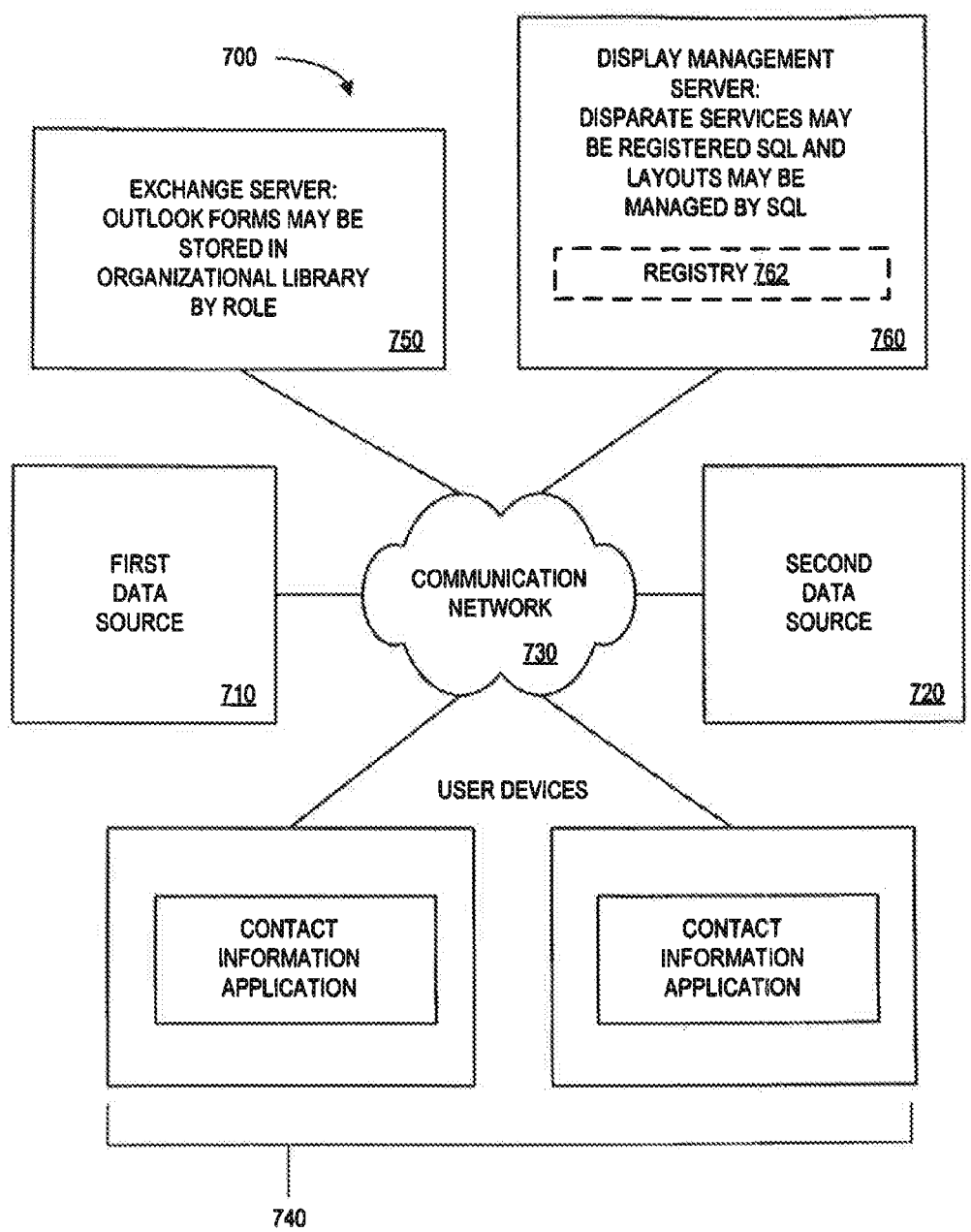
FIG. 7 is a block diagram overview of a system including a remote display management server according to another embodiment of the present invention.

According to some embodiments, the registration information (e.g., associated with services and/or display panes) is locally stored in the registry 252 at the user device 240. According to other embodiments, the registry may be stored at a remote server such that the information associated with the pane is to be available to a plurality of user devices within an enterprise. For example, FIG. 7 is a block diagram overview of a system 700 according to such an embodiment. As before, a first data source 710 and a second data source 720 may transmit information via a communication network 730. Moreover, a plurality of user devices 740 may receive the information from the data sources 710, 720. Note that each user device 740 may execute a contact information application (e.g., MICROSOFT OFFICE OUTLOOK®).

According to this embodiment, the user devices 740 interact with an exchange server 750 and a remote display management server 760 that stores a registry 762. The exchange server 750 may, for example, facilitate storage of MICROSOFT OFFICE OUTLOOK® forms in an organizational library by role (e.g., a user's function within an enterprise). Moreover, when a service is to be registered, the registration information is stored in the remote registry 762 (e.g., including the methods and properties associated with the service). The display management server 760 may register disparate services and/or manage layouts in accordance with a standard interactive and programming language for getting information from and updating a database, such as a Structured Query Language (SQL).

In this way, information associated with a plurality of panes and/or user devices 740 can be stored at the registry 762. For example, a one type of pane might be appropriate for an employee who works in a human resources department while another type of pane is more appropriate for an employee who works as a broker (e.g., due to differences in workflow and/or business processes). In this case, an appropriate pane may be selected for a user device based on his or her role in an enterprise.

Figure 8:
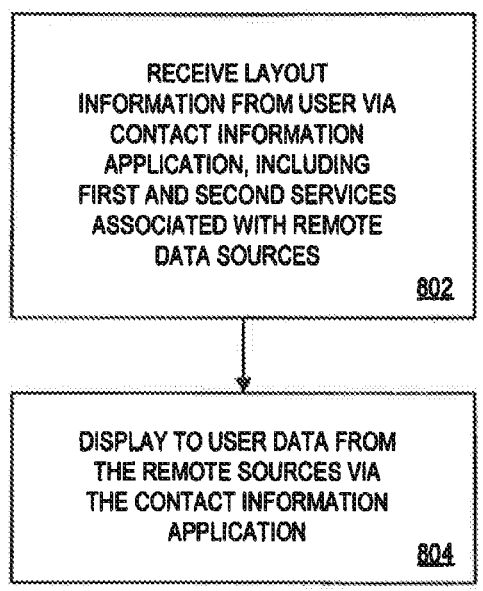
FIG. 8 is a flow chart of a method associated with a contact management application according to some embodiments of the present invention.

FIG. 8 is a flow chart of a method of according to some embodiments of the present invention. According to these embodiments, at 802 layout information is received from a user via a contact information application (e.g., facilitated using a tool bar add-in to MICROSOFT OUTLOOK). The received information might, for example, lay out a first and second display area (the first display area being associated with a first service to receive data from a first remote source and the second display area being associated with a second service to receive data from a second remote source).

At 804, data from the first and second remote sources is displayed to a user via the contact information application. For example, the information might be displayed via a display pane of the contact information application. By using the contact information application to receive about and/or to display information through an integrated display, the existing infrastructure associated with the contact information application can be efficiently utilized (and the amount of separate display management structure required may be reduced).

Figure 9:
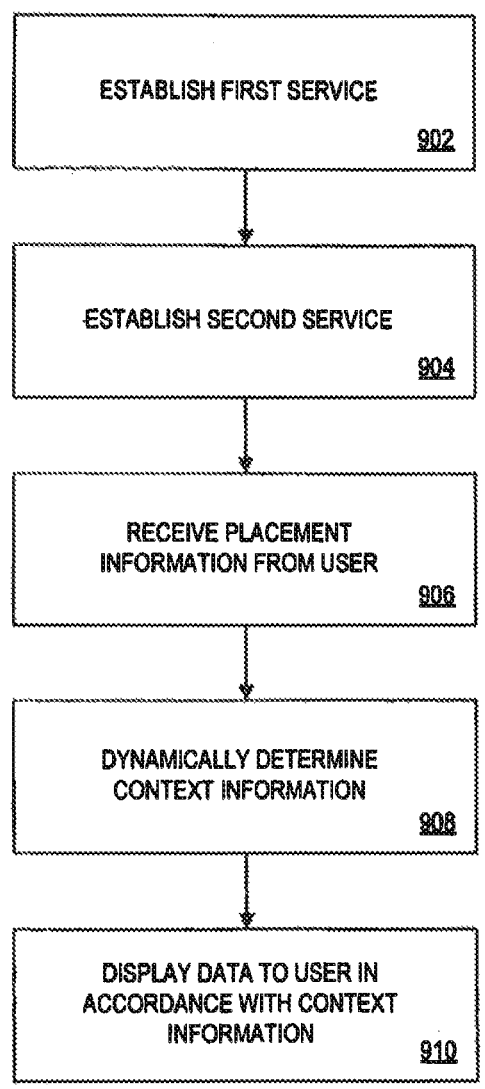
FIG. 9 is a flow chart of a method of passing context information according to another embodiment of the present invention.

FIG. 9 is a flow chart of a method of according to another embodiment of the present invention. At 902, a first service to receive data from a first remote source is established. Similarly, at 904 a second service to receive data from a second remote source is established, the second remote source being independent of the first remote source. At 904, placement information is received from a user to lay out the first and second services within a pane of a host application. Information about the services and/or the pane may be stored, for example, at a local registry and/or at a remote, enterprise-wide server.

At 908, context information associated with the first service is dynamically determined. Information from the first and second remote sources may then be displayed to the user at 910 within the pane. Note that the information from the first and/or second remote sources may be associated with the context information. The context information may come from, for example, a host application. Consider, for example, MICROSOFT OUTLOOK as a host application. In this case, a "business address" (which is typically stored by MICROSOFT OUTLOOK) may be context information that is needed by a service (e.g., the service might automatically display tax information based on the business address). In other cases, the context information may come from a user. For example, a user might type in a stock symbol, and a service might then display prices and trades associated with that stock. In still other cases, context information for one service may come from another service. For example, a service might "publish" information that can be consumed by other services (e.g., another service might chart or graph published data). In this way, context information and the associated layout of that information may facilitate a workflow process for a user.

Figure 10:
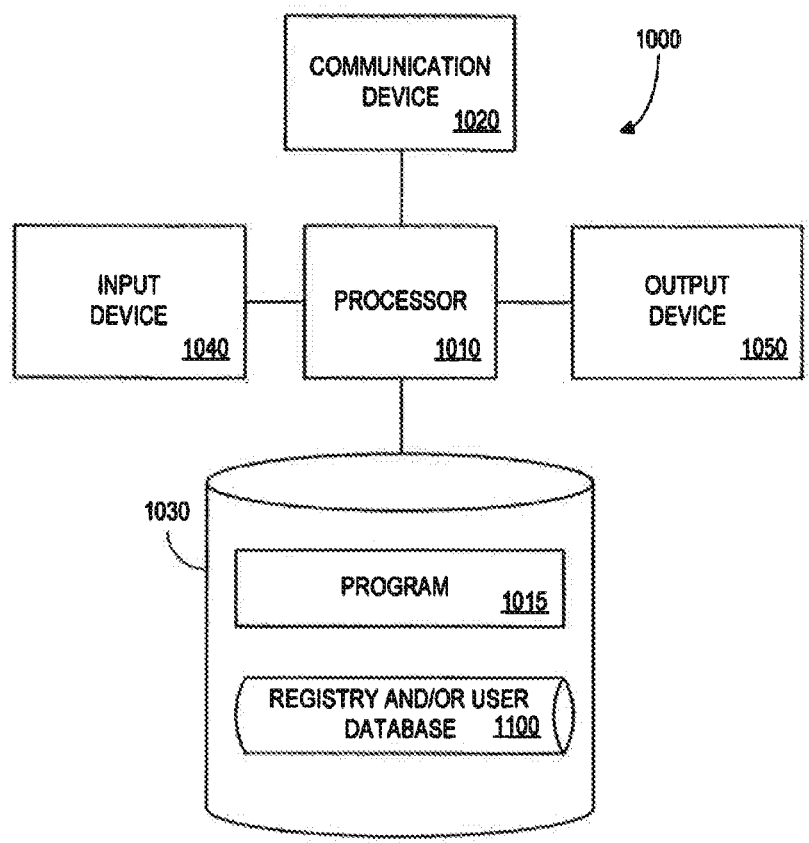
FIG. 10 is a block diagram of an apparatus according to some embodiments of the present invention.

FIG. 10 is an apparatus 1000 according to some embodiments of the present invention. The apparatus 1000 may be associated with, for example, the user device 240 of FIG. 2A and/or the user device 740 of FIG. 7. The user device 1000 includes a processor 1010, such as one or more INTEL® Pentium® processors, coupled to a communication device 1020 configured to communicate via, for example, a communication channel or network. The communication device 1020 may be used to communicate, for example, with one or more remote data servers. The processor 1010 may also receive information via an input device 1040 (e.g., a keyboard or computer mouse used to layout service information) and provide information via an output device 1050 (e.g., a display monitor that displays service information).

The processor 1010 is also in communication with a storage device 1030. The storage device 1030 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

As shown in FIG. 10, the storage device 1030 also stores a program 1015 that may store instructions to control the operation of the processor 1010 in accordance with any of the embodiments described herein. For example, the processor 1010 may register a first service and a second service with a registry. The information stored in the registry might include, for example, indications that the first and/or second services are to receive data from disparate remote sources. According to some embodiments, placement information is received from a user to lay out the first and second services within a pane of an application. Moreover, information from the remote sources may be displayed to the user within the pane.

According to some embodiments, the storage device 1030 further stores registry and/or user database 1100 such as the one illustrated in FIG. 11. The illustration and accompanying description of the database presented herein is exemplary, and any number of other database arrangements could be employed besides those suggested by the figures.

FIG. 11 is a tabular representation of the registry and/or user database 1100 according to one embodiment of the present invention. The table includes entries identifying services that may be activated by a user. The table also defines fields 1102, 1104, 1106, 1108 for each of the entries. The fields specify: a service identifier 1102, a service status 1104, inputs and outputs 1106, and user roles 1108. The information in the registry and/or user database 1100 might be created and updated, for example, by a user and/or an Information Technician (IT) employee of an enterprise.

The service identifier 1102 may be, for example, an alphanumeric string that identifies a particular service that may be activated by a user (e.g., a web service, an applet, or a chart). The service status 1104 may indicate whether each service in the database 1100 is active and, if so, where in a display pane the service should be located. The inputs and outputs 1106 may define for a service what types of data will be received by and/or published from that service. The user roles 1108 may indicate, for example, which types of user will (or should) each service.

Thus, embodiments of the present invention may provide integrated, context-passing solutions to display information to user. Moreover, users may be able to integrate, send, and receive context across disparate services and other forms of interactive communication through computer networks. By exposing properties and methods associated with various services through a centralized management console, using an existing enterprise infrastructure, a more productive business process or workflow may be provided.

The following illustrates various additional embodiments of the present invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although some embodiments have been described herein with respect to financial information, the present invention may be used in connection with any other type of information. For example, a display pane might display information associated with real estate prices, stocks and bonds, a sales application, customer service data, and/or news articles.

Moreover, the various systems provided herein are merely for illustration and embodiments may be associated with any type of network topologies and/or user display layouts.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A non-transitory computer-readable medium having instructions configured to be executed by a processor of a display management server to perform operations comprising:

storing, at the display management server, first registration information associated with a first service configured to receive first data from a first source, second registration information associated with a second service configured to receive second data from a second source distinct from the first source, and pane information corresponding to a plurality of panes, wherein each pane of the plurality of panes corresponds to a role of a user within an organization;

receiving layout information, at the display management server, from a user device of a plurality of user devices communicatively coupled to the display management server via a network, wherein the layout information is configured to position the first service in a first area of a graphical user interface (GUI) operating within an electronic mail application and displayed on the user device and to position the second service in a second area of the GUI distinct from the first area, and wherein the first source and the second source are communicatively coupled to the display management server via the network;

selecting, by the display management server, a pane, from the pane information stored at the display management server, the selecting based on the role of a user, the user associated with the user device; and sending, by the display management server, the layout information to the user device, wherein, in response to receipt of the layout information, the user device is configured to render the first service at the first area and the second service at the second area.

2. The non-transitory computer-readable medium of claim 1, wherein the operations further comprise storing, at the display management server, information indicating a first role authorized to use the first service and a second role authorized to use the second service.

3. The non-transitory computer-readable medium of claim 1, wherein the first source corresponds to a first database, and wherein the second source corresponds to a second database distinct from the first database.

4. The non-transitory computer-readable medium of claim 3, wherein the first service corresponds to an applet, and wherein the second service corresponds to an Active X service.

5. The non-transitory computer-readable medium of claim 1, wherein the first registration information, the second registration information, and the pane information are stored in a registry of the display management server.

6. The non-transitory computer-readable medium of claim 5, wherein the organization comprises a business organization, and wherein the role of the user corresponds to a function of the user within the organization.

7. The non-transitory computer-readable medium of claim 1, wherein the sending the layout information occurs after receiving the layout information.

8. The non-transitory computer-readable medium of claim 1, further comprising dynamically determining context information based on data stored in the electronic mail application, wherein the data stored in the electronic mail application comprises an address of a business.

9. The non-transitory computer-readable medium of claim 8, wherein the first service is configured to generate data responsive to the context information.

10. A display management server configured to facilitate an integrated display of information to a user, the display management server comprising:

a communication port configured to exchange data via a network; and a processor coupled to the communication port, wherein the processor is configured to:

store first registration information associated with a first service configured to receive first data from a first source, second registration information associated with a second service configured to receive second data from a second source distinct from the first source, and pane information corresponding to a plurality of panes, wherein each pane of the plurality of panes corresponds to a role of a user within an organization;

receive layout information from a user device of a plurality of user devices communicatively coupled to the display management server via a network, wherein the layout information is configured to position the first service in a first area of a graphical user interface (GUI) displayed on the user device and to position the second service in a second area of the GUI distinct from the first area, and wherein the first source and the second source are communicatively coupled to the display management server via the network;

select a pane, from a plurality of panes stored at the display management server, the selection based on a role of a user, the user associated with the user device, wherein the user device is configured to operate an electronic mail application, and wherein the first service and the second service are rendered within the electronic mail application; and send the layout information to the user device, wherein, in response to receipt of the layout information, the user device is configured to render the first service at the first area and the second service at the second area.

11. The display management server of claim 10, further comprising a registry, wherein the registry is configured to store the first registration information, the second registration information, and the pane information.

12. The display management server of claim 11, wherein the registry is further configured to store data indicating the role of the user within the organization permitted to use at least one of the first service or the second service.

13. The display management server of claim 10, wherein the processor is further configured to:

receive second layout information from a second user device of the plurality of user devices, wherein the second layout information is configured to position the first service in a third area of a second GUI displayed on the second user device and to position the second service in a fourth area of the second GUI distinct from the third area.

14. The display management server of claim 13, wherein the processor is further configured to:

after receipt of the second layout information, send the second layout information to the second user device, wherein, in response to receipt of the second layout information, the second user device is configured to render the first service at the third area and the second service at the fourth area.

15. A system configured to provide an integrated information display, the system comprising:

a first data source associated with a first service;

a second data source associated with a second service;

an exchange server configured to store electronic forms associated with an electronic mail application in a database organized by a role of each user associated with a user device of a plurality of user devices;

a display management server comprising:

a communication port configured to exchange data via a network; and a processor coupled to the communication port, wherein the processor is configured to:

store first registration information associated with a first service configured to receive first data from a first source, second registration information associated with a second service configured to receive second data from a second source distinct from the first source, and pane information corresponding to a plurality of panes, wherein each pane of the plurality of panes corresponds to a role of a user within an organization;

receive layout information from a user device of a plurality of user devices communicatively coupled to the display management server via a network, wherein the layout information is configured to position the first service in a first area of a graphical user interface (GUI) displayed on the user device and to position the second service in a second area of the GUI distinct from the first area, and wherein the first source and the second source are communicatively coupled to the display management server via the network;

after receipt of the layout information configured to position the first service in the first area and to position the second service in the second area, select a pane, from a plurality of panes stored at the display management server, the selection based on a role of a user, the user associated with the user device, wherein the user device is configured to operate the electronic mail application, and wherein the first service and the second service are rendered within the electronic mail application; and send the layout information to the user device, wherein, in response to receipt of the layout information, the user device is configured to render the first service at the first area and the second service at the second area; and a plurality of user devices configured to access a network, wherein the network is configured to communicatively couple the first data source, the second data source, the exchange server, and the display management server, wherein the user device of the plurality of user devices is configured to render the first service and the second service on a display of the user device in accordance with the layout information and within the electronic mail application operating on the user device.

16. The system of claim 15, wherein the first source corresponds to a first database, and wherein the second source corresponds to a second database distinct from the first database.

17. The system of claim 16, wherein the first service corresponds to an applet, and wherein the second service corresponds to an Active X service.

18. The system of claim 15, further comprising the network.

19. The system of claim 18, wherein the display management server further comprises a registry, wherein the registry is configured to store the first registration information, the second registration information, and the pane information.

* * * * *